US012391008B1

(12) United States Patent
Hardy (10) Patent No.: US 12,391,008 B1
(45) Date of Patent: Aug. 19, 2025

(54) METHOD OF INSERTING A REINFORCING ROD INTO A SPORTS PADDLE

(71) Applicant: MAH Technologies, LLC, Paso Robles, CA (US)

(72) Inventor: Michael Hardy, Paso Robles, CA (US)

(73) Assignee: MAH Technologies, LLC, Paso Robles, CA (US)

( * ) Notice: Subject to any disclaimer, the term of this patent is extended or adjusted under 35 U.S.C. 154(b) by 0 days.

(21) Appl. No.: 18/937,378

(22) Filed: Nov. 5, 2024

(51) Int. Cl.
*B29C 65/00* (2006.01)
*A63B 59/42* (2015.01)
*A63B 102/08* (2015.01)
*A63B 102/16* (2015.01)
*B29C 65/64* (2006.01)
*B29K 307/04* (2006.01)
*B29L 31/52* (2006.01)

(52) U.S. Cl.
CPC .......... *B29C 66/0224* (2013.01); *B29C 65/64* (2013.01); *B29C 66/0222* (2013.01); *B29C 66/727* (2013.01); *B29C 66/7444* (2013.01); *A63B 59/42* (2015.10); *A63B 2102/08* (2015.10); *A63B 2102/16* (2015.10); *A63B 2209/02* (2013.01); *B29K 2307/04* (2013.01); *B29L 2031/52* (2013.01)

(58) Field of Classification Search
CPC . B29C 66/0224; B29C 65/64; B29C 66/0222; B29C 66/727; B29C 66/7444; A63B 59/42; A63B 2102/08; A63B 2102/16; A63B 2209/02; A63B 59/40; A63B 59/00; A63B 2102/00; B29K 2307/04; B29L 2031/52
See application file for complete search history.

(56) References Cited

U.S. PATENT DOCUMENTS

| | | | |
|---|---|---|---|
| 3,461,593 A | 8/1969 | Martuch et al. | |
| 4,105,205 A | 8/1978 | Theodores et al. | |
| 4,349,199 A | 9/1982 | Vulcano | |
| 4,358,113 A | 11/1982 | McKinnon et al. | |
| 4,953,862 A * | 9/1990 | Uke | A63B 60/10 81/177.1 |
| 5,409,216 A | 4/1995 | Brown | |
| 6,257,997 B1 | 7/2001 | Doble et al. | |
| 7,008,339 B2 * | 3/2006 | Sutherland | A63B 59/54 473/566 |
| 7,485,054 B2 * | 2/2009 | Rigoli | A63B 60/10 D21/724 |
| 7,726,346 B2 * | 6/2010 | Doble | A63B 53/10 473/316 |
| 8,328,666 B2 * | 12/2012 | Hsu | B29C 70/68 473/535 |
| 9,982,963 B2 * | 5/2018 | Johnson | A63B 60/06 |
| 10,077,967 B1 * | 9/2018 | Johnson | A63B 60/10 |
| 10,197,357 B2 * | 2/2019 | Johnson | A63B 59/40 |

(Continued)

*Primary Examiner* — Lawrence Averick
(74) *Attorney, Agent, or Firm* — Nicholas Palacio (57) ABSTRACT

A manufacturing method for a sports paddle, wherein a reinforcing rod is inserted into the sports paddle, so that the reinforcing rod is located across the handle, throat, and head portions of the sports paddle. In some embodiments, a priming rod is used to create a cavity in the core of the sports paddle so that the reinforcing rod can be placed in the cavity. The manufacturing process results in a reinforced sports paddle that can withstand greater mechanical stress throughout the paddle.

20 Claims, 7 Drawing Sheets

(56) References Cited

U.S. PATENT DOCUMENTS

| | | | |
|---|---|---|---|
| 10,371,481 B2 * | 8/2019 | Johnson | F42B 6/003 |
| 10,653,924 B2 * | 5/2020 | Severa | G01N 3/22 |
| 12,139,235 B2 * | 11/2024 | Lee | H01M 4/668 |
| 2003/0144071 A1 | 7/2003 | Dodge et al. | |
| 2004/0166970 A1 * | 8/2004 | Sutherland | A63B 59/54 |
| | | | 473/567 |
| 2005/0079925 A1 | 4/2005 | Cheng et al. | |
| 2006/0122013 A1 * | 6/2006 | Dodge | A63B 59/00 |
| | | | 473/524 |
| 2007/0287561 A1 * | 12/2007 | Rigoli | A63B 60/06 |
| | | | 473/316 |
| 2011/0136602 A1 * | 6/2011 | Hsu | A63B 60/00 |
| | | | 473/535 |
| 2015/0217171 A1 * | 8/2015 | Johnson | A63B 60/06 |
| | | | 473/549 |
| 2016/0107053 A1 | 4/2016 | Pree | |
| 2017/0045325 A1 * | 2/2017 | Johnson | A63B 60/10 |
| 2018/0266790 A1 * | 9/2018 | Johnson | A63B 60/08 |
| 2018/0356182 A1 * | 12/2018 | Johnson | A63B 60/06 |
| 2019/0178607 A1 * | 6/2019 | Johnson | A63B 60/08 |
| 2019/0275379 A1 * | 9/2019 | Severa | G01N 3/22 |
| 2022/0355166 A1 * | 11/2022 | Severa | A63B 60/08 |
| 2023/0218962 A1 * | 7/2023 | Lee | F41B 5/1484 |
| | | | 473/223 |

* cited by examiner

METHOD OF INSERTING A REINFORCING ROD INTO A SPORTS PADDLE

BACKGROUND

Paddle sports and games such as pickleball and table tennis utilize a sports paddle to play. As manufacturers continue to use different materials to adjust the weight and performance characteristics of sports paddles, the flexibility and stiffness of the sports paddle can be negatively affected. During a normal course of play, sports paddles are subjected to forces that can impart a significant amount of stress on the sports paddle. When a sports paddle is subjected to significant stress, the paddle head may become separated from the handle portion due to fracturing, leaving the sports paddle broken and unusable. As a result, sports paddles are currently limited to certain materials, shapes, and configurations to ensure that the sports paddle does not fracture under significant mechanical stress.

Currently, there is a need to reinforce and strengthen all types of sports paddles to reduce the likelihood that a sports paddle will break, especially a breakage occurring at the throat portion of the sports paddle. Manufacturers need an improved method of manufacturing sports paddles which provides greater structural stability and reduces the likelihood that a sports paddle will break.

SUMMARY

Accordingly, there is disclosed herein a method of manufacturing a sports paddle wherein a reinforcing rod is inserted into the sports paddle to reinforce the head, throat, and handle portion of the sports paddle.

There is further disclosed a method of manufacturing a sports paddle wherein the reinforcing rod is inserted into a cavity of the sports paddle to reinforce the head, throat, and handle portion of the sports paddle.

The presently disclosed method of manufacturing ensures that a variety of materials, shapes, and configurations can be used for sports paddles by inserting a reinforcing rod into the areas where the sports paddle is most likely to fail. In some embodiments, the reinforcing rod is inserted using a mechanical force to push through the core material of the paddle. In some embodiments, a priming rod is used to create a cavity to receive the reinforcing rod. In some embodiments, a cavity is created by mechanically removing material from the sports paddle.

Each of the foregoing implementations can be employed individually or in conjunction and may include one or more of the following features in any suitable combination. Further embodiments, forms, features, and aspects of the present application shall become apparent from the description and figures provided herewith.

DETAILED DESCRIPTION

Note that the specific embodiments given in the drawings and following description do not limit the disclosure. On the contrary, they provide the foundation for one of ordinary skill to discern the alternative forms, equivalents, and modifications that are contemplated by the inventors and encompassed in the claim scope.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

Numerous alternative forms, equivalents, and modifications will become apparent to those skilled in the art once the above disclosure is fully appreciated. It is intended that the claims be interpreted to embrace all such alternative forms, equivalents, and modifications where applicable.

The term "attached", "inserted", "joined", "assembled" and variations thereof, as used herein, means the joining of two members directly or indirectly to one another. Such joining may be achieved with the two members coupled directly to each other, with the two members coupled to each other using a separate intervening member and any additional intermediate members coupled with one another, or with the two members coupled to each other using an intervening member that is integrally formed as a single body with one of the two members.

In some embodiments, the sports paddle can be a paddle used in pickleball, table tennis, ping pong, or other similar paddle sports. The sports paddle includes a head, a face for striking the ball during play, a throat, and a handle.

In some embodiments, the reinforcing rod can have cross sections such as, but not limited to a circle, square, rectangle, oval, or triangle. In some embodiments, the reinforcing rod can have an irregularly shaped cross section. In some embodiments, the reinforcing rod has a constant width, diameter, and height along the length of the rod. In some embodiments, the reinforcing rod can have a non-constant width, diameter, and height along the length of the rod. In some embodiments, the reinforcing rod can be a hollow tube. In some embodiments, the reinforcing rod is constructed materials such as, but not limited to carbon fiber, fiberglass, aluminum, laminated fiberglass, plastics reinforced with natural fibers, galvorn, kevlar, or PLA composite material. In some embodiments, a single reinforcing rod is inserted into the sports paddle. In some embodiments, multiple reinforcing rods are inserted into the sports paddle.

In some embodiments, the core of the sports paddle can be constructed from materials such as, but not limited to, polypropylene, wood, aluminum, or a composite. In some embodiments the core of the sports paddle may have a structure such as, but not limited to, a honeycomb structure, a webbed structure, or a solid structure.

In some embodiments, a cavity can be formed in the core of the sports paddle, wherein the cavity spans the handle, throat, and face portions of the sports paddle. In some embodiments the cavity of the desired shape can be formed in the sports paddle for placing a reinforcing rod by mechanically removing core material from the sports paddle such as, but not limited to, drilling, carving, punching, suctioning, cutting, milling and reaming. In some embodiments, the cavity of the desired shape can be formed in the sports paddle by melting, boiling, burning, or vaporizing the core material. The thermal removal of core material from the sports paddle can be performed with a priming rod by inserting a priming rod into the core of the sports paddle. The priming rod can be constructed of materials such as, but not limited to, metal, ceramic, plastic, composite, and glass. In some embodiments, the priming rod can reach a temperature to melt, boil, or vaporize the core material when it is inserted into the sports paddle. In some embodiments, the priming rod is heated to a temperature between 400 and 600 degrees Celsius. In some embodiments, the priming rod is heated to a temperature between 160 and 800 degrees Celsius. In some embodiments, the priming rod is cooled after a cavity of the desired shape is formed. In some embodiments, the core material is cooled after a cavity of the desired shape is formed from the thermal removal process.

In some embodiments, the reinforcing rod can be directly inserted into the sports paddle using mechanical forces imparted by devices such as, but not limited to, a hydraulic press, a manual press, a pneumatic press, a pneumatic intensified press, an electric press, or a hammer.

In some embodiments, the reinforcing rod can be lubricated before assembled to the sports paddle. In some embodiments, the hole in the core material is lubricated before assembled with the reinforcing rod. In some embodiments, a lubricant can be applied during assembly, such as, but not limited to a dry lubricant, a solvent, or an oil-based lubricant.

In some embodiments the handle may have a coupling means for locking the reinforcing rod into place after assembly. The handle of the sports paddle may have a hole for receiving a pin, screw, bolt, fastener, or other coupling mechanism. In some embodiments, a locking member such as but not limited to a pin, screw, bolt, fastener or other coupling member may be inserted into the coupling means to lock the reinforcing rod into place after assembly. In some embodiments, the reinforcing rod may be locked into place using a filler material inserted into the cavity after the reinforcing rod is inserted.

Figure 1:
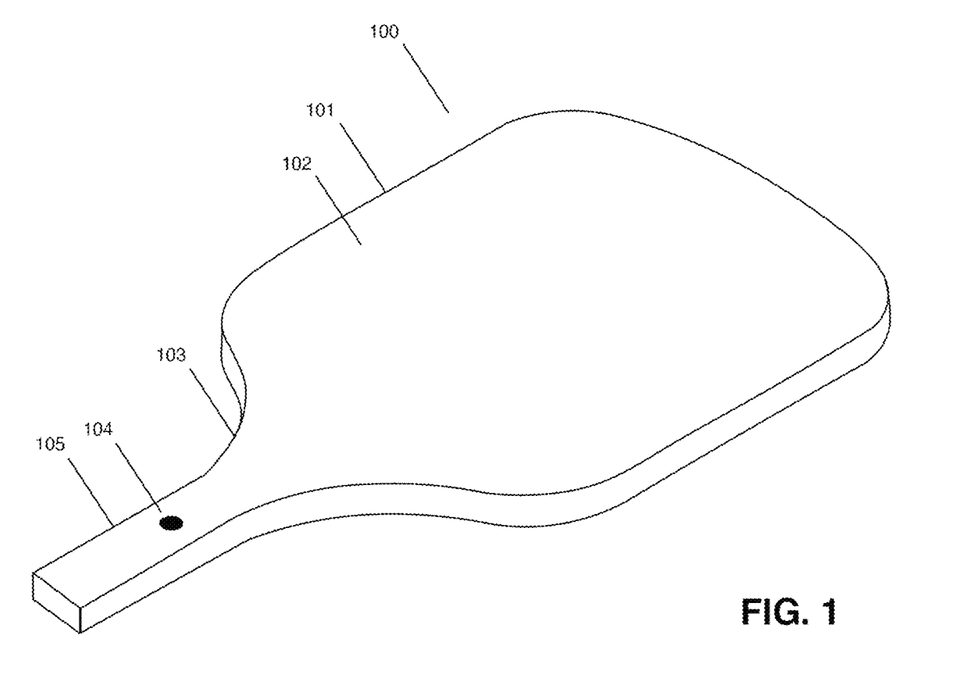
FIG. 1 illustrates a perspective view of an embodiment of a sports paddle.

FIG. 1 illustrates an embodiment of a sports paddle 100. Sports paddle 100 has a head 101, a face 102, a throat 103, a coupling means 104, a handle 105, and a core 106. Coupling means 104 is shown as a hole for receiving a coupling mechanism such as a pin, screw, bolt, or fastener.

Figure 2:
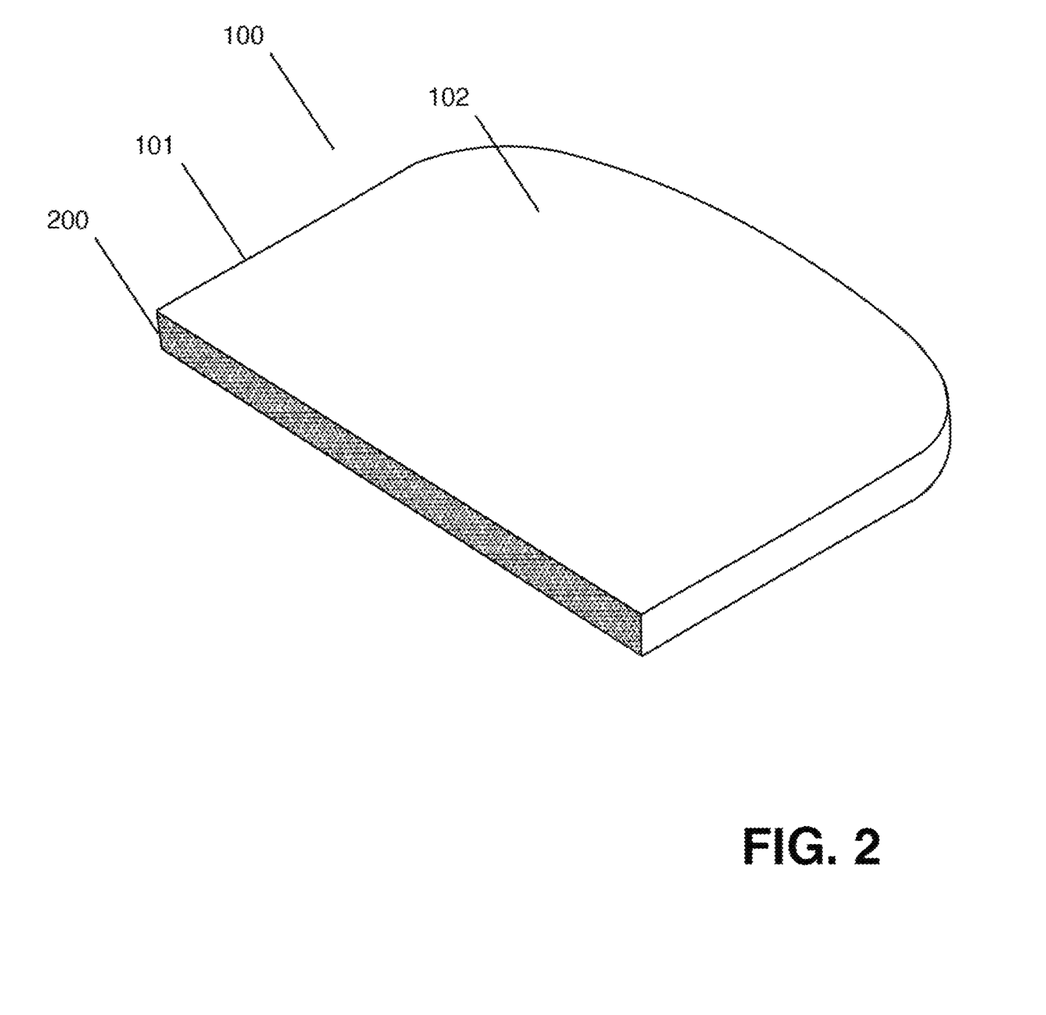
FIG. 2 illustrates a cross-sectional view of an embodiment of a sports paddle.

FIG. 2 illustrates a cross-sectional view of an embodiment of sports paddle 100. The cross-sectional view only shows a portion of the head 101, with a core 200 shown in the middle of sports paddle 100. Core 200 fills the internal space of sports paddle 100, and head 101.

Figure 3:
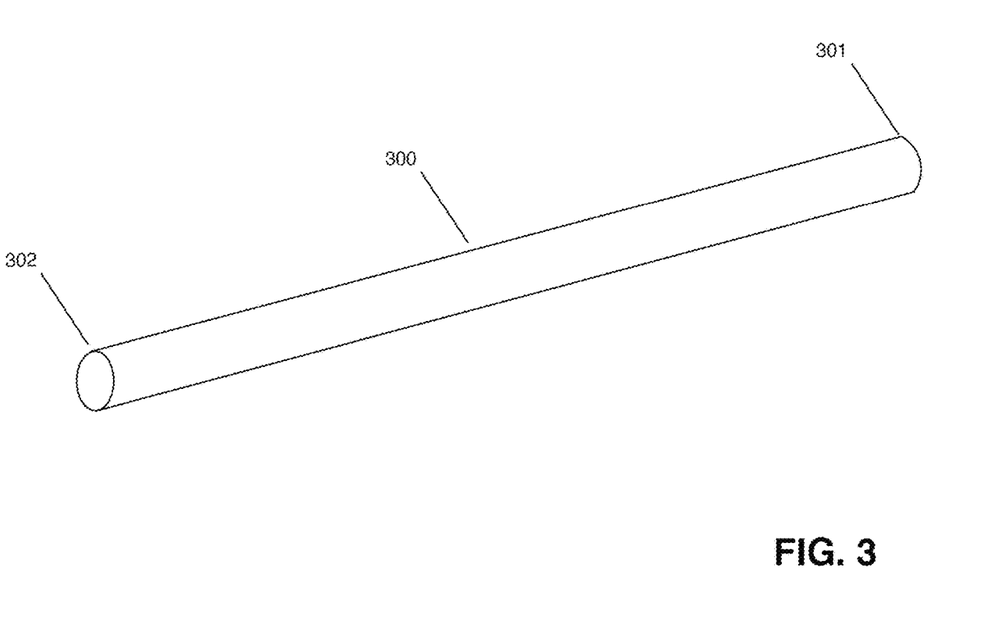
FIG. 3 illustrates a perspective view of a reinforcing rod.

FIG. 3 illustrates an embodiment of a reinforcing rod 300 with a distal end 301 and a proximal end 302.

Figure 4:
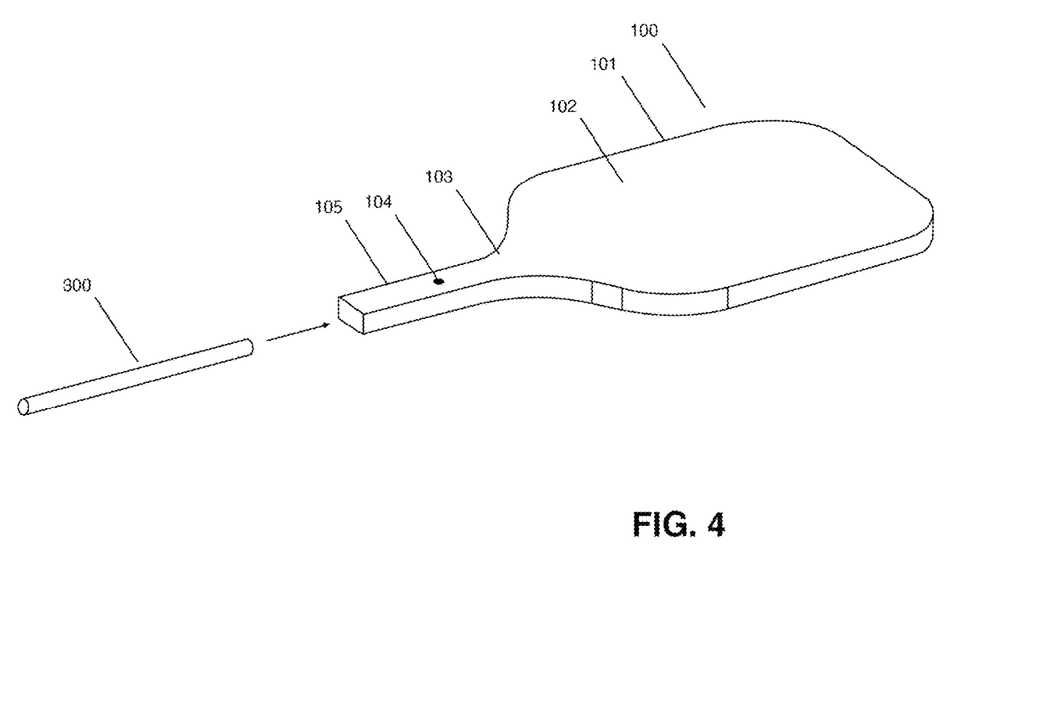
FIG. 4 illustrates a perspective view of an embodiment of the sports paddle and the reinforcing rod during assembly.

FIG. 4 illustrates an embodiment of the manufacturing process. Reinforcing rod 300 is located axially to handle 105 of sports paddle 100. Reinforcing rod 300 will be inserted into sports paddle 100 through handle 104 so that reinforcing rod 300 can move through core (not pictured) of sports paddle 100.

Figure 5:
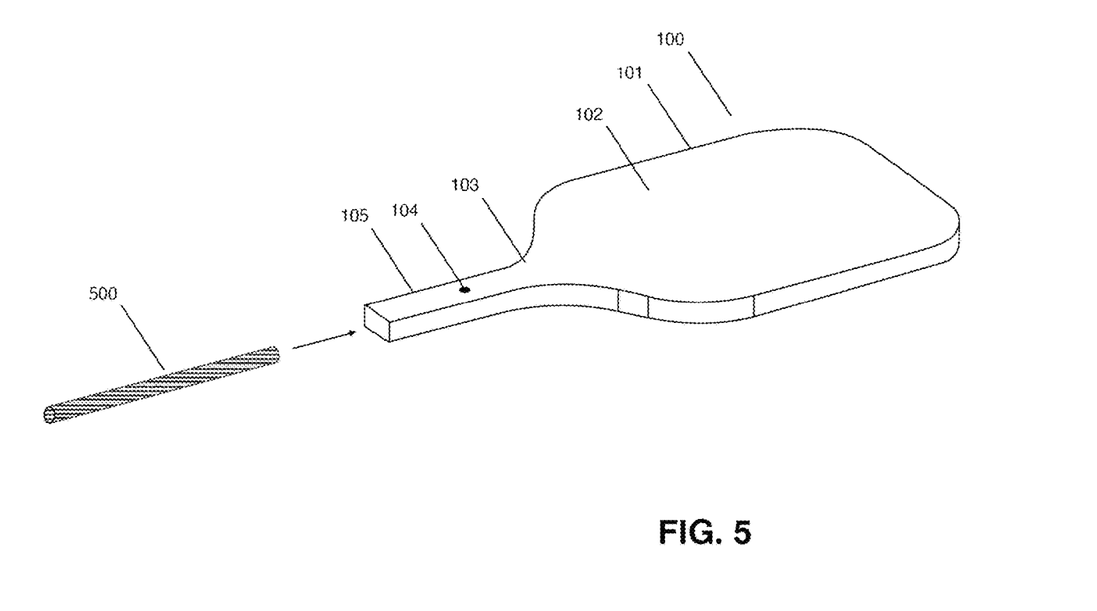
FIG. 5 illustrates a perspective view of an embodiment of the sports paddle before a priming rod is inserted into the sports paddle to create a cavity.

FIG. 5 illustrates an embodiment of the manufacturing process. Priming rod 500 is located axially to handle 105 of sports paddle 100 so that priming rod 500 can be inserted into handle 105 and create a cavity. Priming rod 500 may be a rod that is heated to a temperature between 160 and 800 degrees Celsius. Priming rod 500 may be a drill bit that is rotated during insertion into handle 105.

Figure 6:
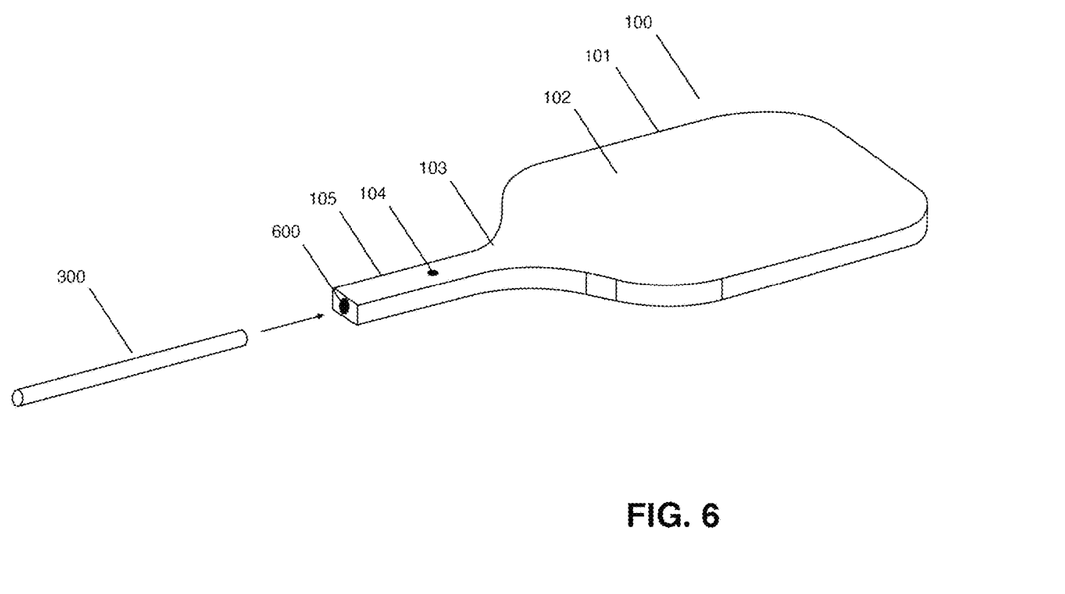
FIG. 6 illustrates a perspective view of an embodiment of the sports paddle and the reinforcing rod during assembly, wherein a cavity is created before the reinforcing rod is inserted into the sports paddle.

FIG. 6 illustrates an embodiment of the manufacturing process. Reinforcing rod 300 is located axially to handle 105 of sports paddle 100. Reinforcing rod 300 will be inserted into sports paddle 100 through a cavity 500 which is formed when material in the core (not pictured) is removed. Cavity 600 is formed in handle 104 so that reinforcing rod 300 can move through cavity 600 of sports paddle 100.

Figure 7:
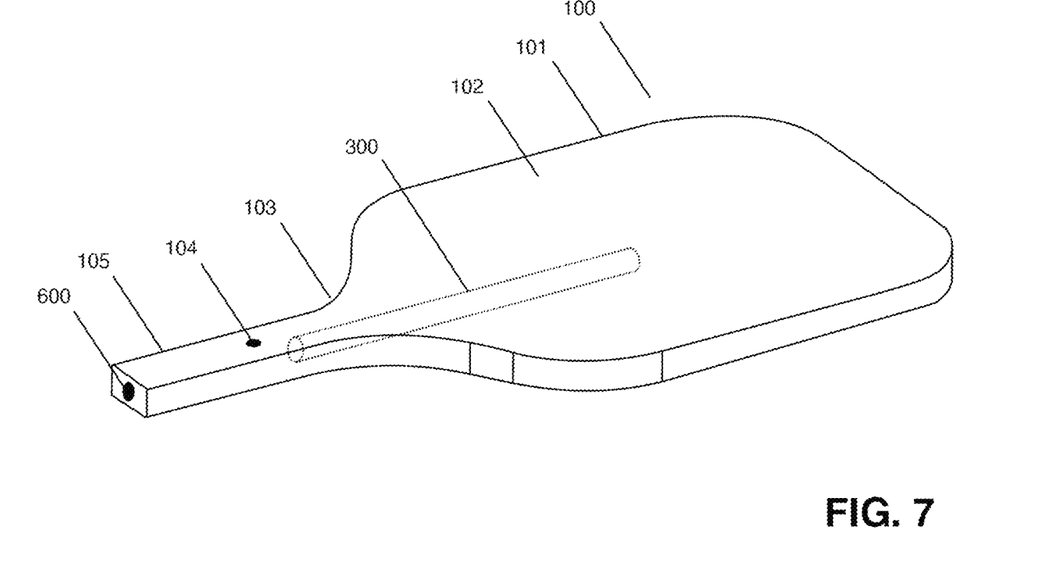
FIG. 7 illustrates a perspective view of an embodiment of the sports paddle and the reinforcing rod after assembly.

FIG. 7 illustrates an embodiment after the assembly process. Reinforcing rod 300 is located across handle 105, throat 103, and head 101 of sports paddle 100. Reinforcing rod 300 is embedded in core of sports paddle 100.

Additionally, it is important to note that each term used herein refers to that which one of ordinary skill would understand such term to mean based on the contextual use of such term herein. To the extent that the meaning of a term used herein, as understood by one of ordinary skill based on the contextual use of such term, differs in any way from any dictionary definition of such term, it is intended that the meaning of the term as understood by one of ordinary skill should prevail.

What is claimed is:

1. A method of manufacturing a sports paddle comprising:
   providing the sports paddle with a head, at least one face, a throat, a handle, and a core;
   providing at least one reinforcing rod;
   inserting the at least one reinforcing rod into the core of sports paddle so that the at least one reinforcing rod is located in the head, the throat, and the handle of the sports paddle.

2. The method of manufacturing the sports paddle according to claim 1, wherein a priming rod is inserted into the core of the sports paddle to create a cavity, wherein the cavity receives the at least one reinforcing rod.

3. The method of manufacturing the sports paddle according to claim 2, wherein the priming rod is heated to a temperature between 160 and 800 degrees Celsius before inserting the priming rod into the core of the sports paddle.

4. The method of manufacturing the sports paddle according to claim 2, wherein the priming rod is a drill bit which is rotated during insertion to create the cavity in the sports paddle.

5. The method of manufacturing the sports paddle according to claim 2, wherein the at least one reinforcing rod is comprised of a carbon fiber material.

6. The method of manufacturing the sports paddle according to claim 2, wherein the at least one reinforcing rod is secured in the paddle using a coupling means.

7. The method of manufacturing the sports paddle according to claim 2, wherein the core comprises a foam material.

8. The method of manufacturing the sports paddle according to claim 5, wherein the priming rod is heated to a temperature between 160 and 800 degrees Celsius and inserted into the core of the sports paddle to create the cavity, wherein the cavity receives the at least one reinforcing rod.

9. The method of manufacturing the sports paddle according to claim 6, wherein the at least one reinforcing rod is comprised of a carbon fiber material.

10. The method of manufacturing the sports paddle according to claim 7, wherein the at least one reinforcing rod is comprised of a carbon fiber material.

11. A method of manufacturing a sports paddle comprising:
    providing the sports paddle with a head, at least one face, a throat, a handle, and core;
    Providing at least one reinforcing rod;

Inserting the at least one reinforcing rod into the core of the sports paddle so that the at least one reinforcing rod is parallel to the at least one face of the sports paddle, and located in the head, the throat, and the handle of the sports paddle.

12. The method of manufacturing the sports paddle according to claim 11, wherein a priming rod is inserted into the core of the sports paddle to create a cavity, wherein the cavity receives the at least one reinforcing rod.

13. The method of manufacturing the sports paddle according to claim 12, wherein the priming rod is heated to a temperature between 160 and 800 degrees Celsius before inserting the priming rod into the core of the sports paddle.

14. The method of manufacturing the sports paddle according to claim 12, wherein the priming rod is a drill bit which is rotated during insertion to create the cavity in the sports paddle.

15. The method of manufacturing the sports paddle according to claim 12, wherein the at least one reinforcing rod is comprised of a carbon fiber material.

16. The method of manufacturing the sports paddle according to claim 12, wherein the at least one reinforcing rod is secured in the paddle using a coupling means.

17. The method of manufacturing the sports paddle according to claim 12, wherein the core comprises a foam material.

18. The method of manufacturing the sports paddle according to claim 15, wherein the priming rod is heated to a temperature between 160 and 800 degrees Celsius and inserted into the core of the sports paddle to create the cavity, wherein the cavity receives the at least one reinforcing rod.

19. The method of manufacturing the sports paddle according to claim 16, wherein the at least one reinforcing rod is comprised of a carbon fiber material.

20. The method of manufacturing the sports paddle according to claim 17, wherein the at least one reinforcing rod is comprised of a carbon fiber material.

* * * * *